(12) United States Patent
Uselton

(10) Patent No.: US 7,647,762 B2
(45) Date of Patent: Jan. 19, 2010

(54) COMBINED APPARATUS FOR FLUID HEATING AND ELECTRICAL POWER GENERATION

(75) Inventor: Robert B. Uselton, Plano, TX (US)

(73) Assignee: Lennox Industries Inc., Richardson, TX (US)

(*) Notice: Subject to any disclaimer, the term of this patent is extended or adjusted under 35 U.S.C. 154(b) by 666 days.

(21) Appl. No.: 11/212,069

(22) Filed: Aug. 25, 2005

(65) Prior Publication Data

US 2007/0044480 A1   Mar. 1, 2007

(51) Int. Cl.
*F02G 1/00* (2006.01)
(52) U.S. Cl. .................. 60/39.511; 60/39.52; 60/39.183
(58) Field of Classification Search ............. 60/39.182, 60/39.511, 39.52, 784, 39.12, 39.17, 39.181, 60/39.183
See application file for complete search history.

(56) References Cited

U.S. PATENT DOCUMENTS

| | | | |
|---|---|---|---|
| 3,703,146 A * | 11/1972 | Kovats | 105/61.5 |
| 3,765,170 A * | 10/1973 | Nakamura | 60/39.17 |
| 4,347,711 A | 9/1982 | Noe et al. | |
| 4,434,613 A * | 3/1984 | Stahl | 60/784 |
| 5,148,670 A | 9/1992 | Birch et al. | |
| 5,181,376 A * | 1/1993 | Rao | 60/775 |
| 6,298,654 B1 * | 10/2001 | Vermes et al. | 60/774 |
| 6,606,864 B2 * | 8/2003 | MacKay | 60/773 |
| 6,637,183 B2 * | 10/2003 | Viteri et al. | 60/39.182 |
| 6,663,011 B1 | 12/2003 | Entleutner et al. | |
| 6,931,856 B2 * | 8/2005 | Belokon et al. | 60/772 |
| 7,089,743 B2 * | 8/2006 | Frutschi et al. | 60/772 |
| 7,204,077 B2 * | 4/2007 | Tanaka et al. | 60/39.41 |

* cited by examiner

*Primary Examiner*—William H Rodriguez

(57) ABSTRACT

Combined apparatus for heating a fluid and for producing electrical power is comprised of a burner operable to burn a combustible fuel-air mixture to produce gaseous products of combustion; a heat exchanger adapted to receive the products of combustion and to transfer heat therefrom to the fluid; a gas-operated turbine; and an electrical generator that is co-rotatable with the turbine. In operation, gaseous products of combustion are introduced into the turbine after they have passed through at least a portion of the heat exchanger. The products of combustion expand in the turbine to rotate the turbine, which in turn rotates the generator to produce electrical power. The apparatus further includes a compressor that is co-rotatable with the turbine and generator to provide combustion air to the burner and to circulate the products of combustion through the heat exchanger and turbine.

22 Claims, 4 Drawing Sheets

COMBINED APPARATUS FOR FLUID HEATING AND ELECTRICAL POWER GENERATION

TECHNICAL FIELD

This invention relates generally to apparatus for heating fluid, such as air supplied to an indoor space, and in particular to combined apparatus for heating fluid and for producing electrical power.

BACKGROUND ART

Apparatus for heating fluids, such as air supplied to an indoor space or water for domestic use, are well known in the art. Combined apparatus for simultaneously heating fluid and producing electrical power are also known in the art. Such combined apparatus operate on the principle of converting at least some of the heat energy to mechanical energy to operate an electrical generator. Such apparatus typically include a gas turbine and an electrical generator that is mechanically linked to the turbine. Gaseous products of combustion are used to operate the turbine, which in turn operates the generator to produce electricity. Examples of such combined apparatus are shown and described in U.S. Pat. Nos. 5,148,670 and 6,663,011.

In prior art combustion turbines, operating on a Brayton cycle, air in excess of what is needed for combustion is introduced into the system in order to cool the products of combustion entering the turbine. Typically, this dilution air is about three times what is needed for combustion. However, in residential applications, the air intake and discharge flue are not large enough to accommodate such large amounts of excess air, so that the use of a turbogenerator to convert heat to electrical power is not practical for residential applications using prior art systems.

SUMMARY OF THE INVENTION

In accordance with the present invention, combined apparatus for heating fluid and producing electrical power is comprised of a heating device operable to burn a combustible fuel-air mixture to produce gaseous products of combustion and a heat exchanger adapted to receive the products of combustion and to transfer heat therefrom to the fluid. The apparatus further includes a gas-operated turbine and an electrical generator co-operable with the turbine to generate electrical power. In operation, gaseous products of combustion are introduced into the turbine, wherein the products of combustion expand to convert heat energy into mechanical energy to operate the turbine and generator to produce electrical power.

In accordance with one embodiment of the invention, the turbine is in fluid communication with the heat exchanger to receive the products of combustion after the products of combustion have passed through at least a portion of the heat exchanger.

In accordance with another embodiment of the invention, the apparatus further includes a compressor co-operable with the turbine and generator to provide combustion air to the heating device and to exhaust the products of combustion after the products of combustion have passed completely through the heat exchanger.

In accordance with yet another embodiment of the invention, the generator is further operable as a motor to initiate operation of the combined apparatus. The apparatus may include a power source such as a battery to provide electrical power to the generator when the generator is operable as a motor.

In accordance with still another embodiment of the invention, an inverter is provided to convert the electrical power produced by the generator to an electrical output at a predetermined frequency.

In accordance with a preferred embodiment of the invention, the compressor is operable to provide combustion air to the heating device and to exhaust the products of combustion by induced draft. Operation of the compressor draws the products of combustion through the compressor after the products of combustion have passed through the turbine and completely through the heat exchanger. The apparatus also preferably includes an air mover, such as an induced draft blower, that is operable to provide combustion air to the heating device during start-up of the apparatus. A power source, such as a battery, may be provided to operate the air mover.

BEST MODE FOR CARRYING OUT THE INVENTION

The best mode for carrying out the invention will now be described with reference to the accompanying drawings. Like parts are marked in the specification and drawings with the same respective reference numbers. In some instances, proportions may have been exaggerated in order to depict certain features of the invention.

Figure 1:
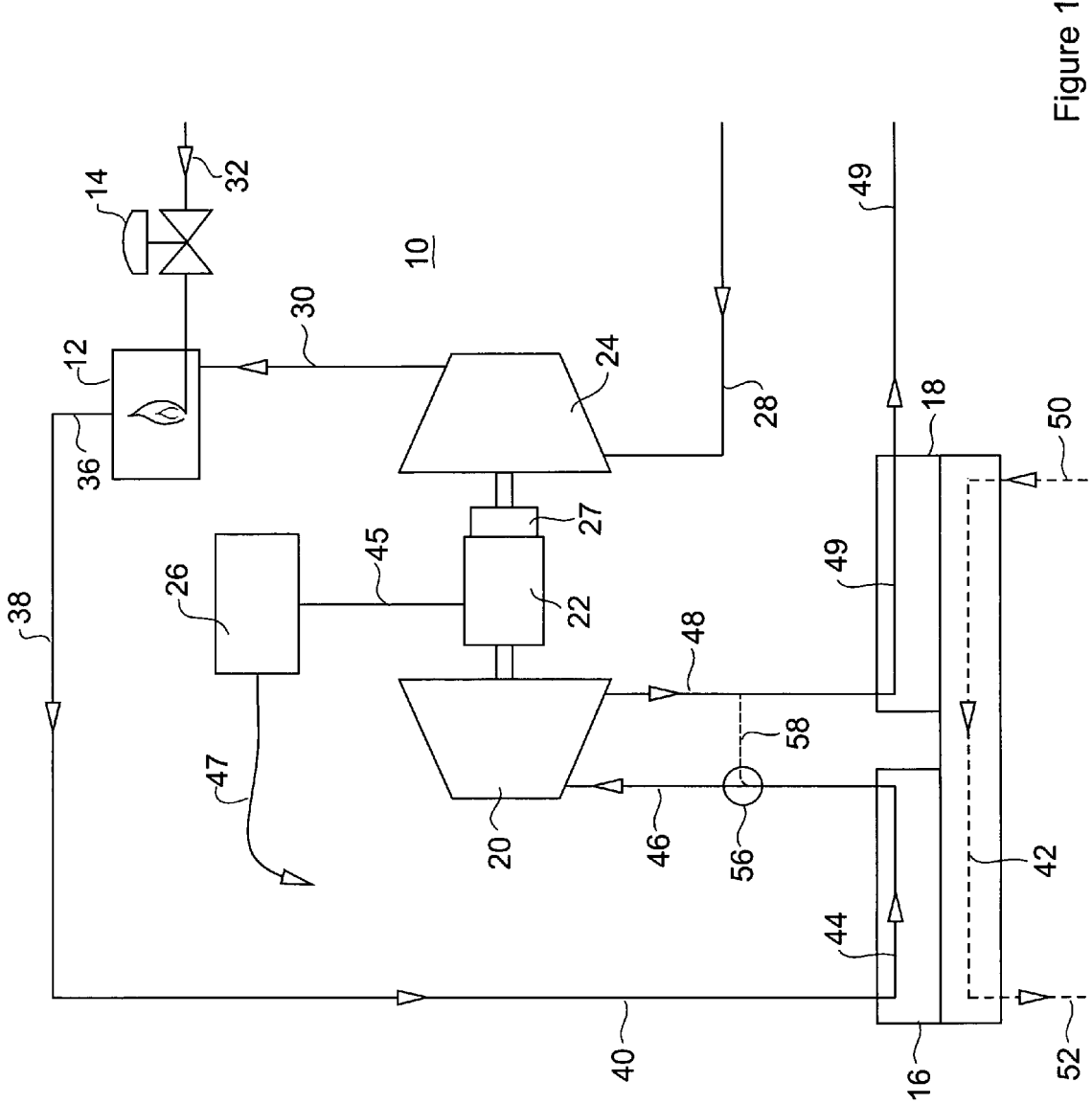
FIG. 1 is a schematic diagram of a first embodiment of a combined apparatus for heating fluid and generating electrical power, in accordance with the present invention.

Referring now to FIG. 1, a combined apparatus 10 for heating a fluid and for producing electrical power is comprised of a conventional heating appliance, such as furnace for heating air supplied to a conditioned space, in combination with a turbo-generator, such as a turbo-charger device of the type sometimes used in automobiles. Specifically, apparatus 10 includes a burner 12, a gas valve 14, two heat exchangers 16, 18, a gas-operated turbine 20, an electrical generator 22, a fluid compressor 24 and a rectifier/inverter 26. Heat exchanger 16 is in fluid communication with burner 12 and is adapted to receive the products of combustion therefrom. Heat exchanger 16 may be a primary heat exchanger of the type used in a conventional heating appliance or at least a first section of a primary heat exchanger. Heat exchanger 18 may be a secondary heat exchanger of the type used in a conventional heating appliance or alternatively, a second section of a primary heat exchanger. Turbine 20 is in fluid communication with the outlet of heat exchanger 16 and the inlet of heat exchanger 18, such that the products of combustion pass through heat exchanger 16 before entering turbine 20. Turbine 20, generator 22 and compressor 24 are mechanically coupled so that all components are operated together.

Generator 22 is adapted to initiate operation of apparatus 10. A power source, such as a battery (not shown) is provided for an electric starter motor 27, which is mechanically coupled to drive generator 22. On system startup, motor 27 operates generator 22, which also operates turbine 20 and compressor 24. When in operation, compressor 24 draws in combustion air, as depicted by arrow 28, compresses it and supplies the compressed air to burner 12 by forced draft, as depicted by arrow 30. A combustible fuel, such as natural gas, is supplied from a fuel source (not shown), as depicted by arrow 32. Gas valve 14 controls the flow of gas to burner 12 in a conventional manner. The gas-air mixture is ignited by means of a pilot flame, hot surface igniter, spark igniter or other conventional igniting device (not shown) and is burned by burner 12 to produce hot gaseous products of combustion. In addition to providing combustion air to burner 12, compressor 24 is further operable to circulate the combustion products by forced draft through heat exchanger 16, turbine 20 and heat exchanger 18, as will be described in greater detail hereinbelow. One skilled in the art will recognize that apparatus 10 is a "positive pressure" system, in the sense that combustion air is supplied to burner 12 and products of combustion are circulated through heat exchanger 16, turbine 20 and heat exchanger 18 by forced draft, such that the system is under positive pressure with respect to atmospheric pressure.

When apparatus 10 is in operation, heat exchanger 16 receives the products of combustion from burner 12, as depicted by arrows 36, 38, 40. Heat from the products of combustion is transferred in heat exchanger 16 to a fluid, such as return air from a conditioned indoor space, which flows across heat exchanger 16 in counterflow relationship, as depicted by dashed arrow 42, to the flow of the combustion products through heat exchanger 16, as depicted by arrow 44. The combustion products are cooled in heat exchanger 16 and after passing therethrough enter turbine 20, as depicted by arrow 46, wherein the combustion gases expand to convert heat energy into mechanical energy to rotate turbine 20. Generator 22 and compressor 24 are mounted for co-rotation with turbine 20 such that operation of turbine 20 also operates generator 22 and compressor 24. Operation of generator 22 produces electrical power at a relatively high frequency due to the high shaft speed of turbine 20 and generator 22. The high frequency output from generator 22 on line 45 is converted to a predetermined frequency (e.g., 60 Hz) by rectifier/inverter 26, as depicted by arrow 47. The electrical power output from rectifier/inverter 26 can be used to operate another appliance or stored for later use.

After exiting turbine 20, the products of combustion enter heat exchanger 18, as depicted by arrow 48, wherein heat is transferred to the return air from the conditioned space, which flows across heat exchanger 18 in counterflow relationship, as represented by dashed arrow 42, to the flow of the combustion products through heat exchanger 18, as depicted by arrow 49. The products of combustion are exhausted from heat exchanger 18 through a conventional flue or the like (not shown) by compressor 24, as also depicted by arrow 49. Return air from the space, as depicted by dashed arrow 50, encounters heat exchanger 18 first and then heat exchanger 16. The products of combustion are hotter in heat exchanger 16 than in heat exchanger 18, such that the return air from the conditioned space is heated first by the cooler products of combustion in heat exchanger 18 and then by the hotter products of combustion in heat exchanger 16. The heated air is supplied to the conditioned space, as depicted by dashed arrow 52.

If it is desired to use apparatus 10 only as a heating apparatus and not to generate electrical power, a bypass valve 56 located between an outlet of heat exchanger 16 and an inlet of turbine 20 may be closed to inhibit products of combustion from entering turbine 20 and to cause the products of combustion to flow from heat exchanger 16 directly to heat exchanger 18, as depicted by arrows 58, 48.

Figure 2:
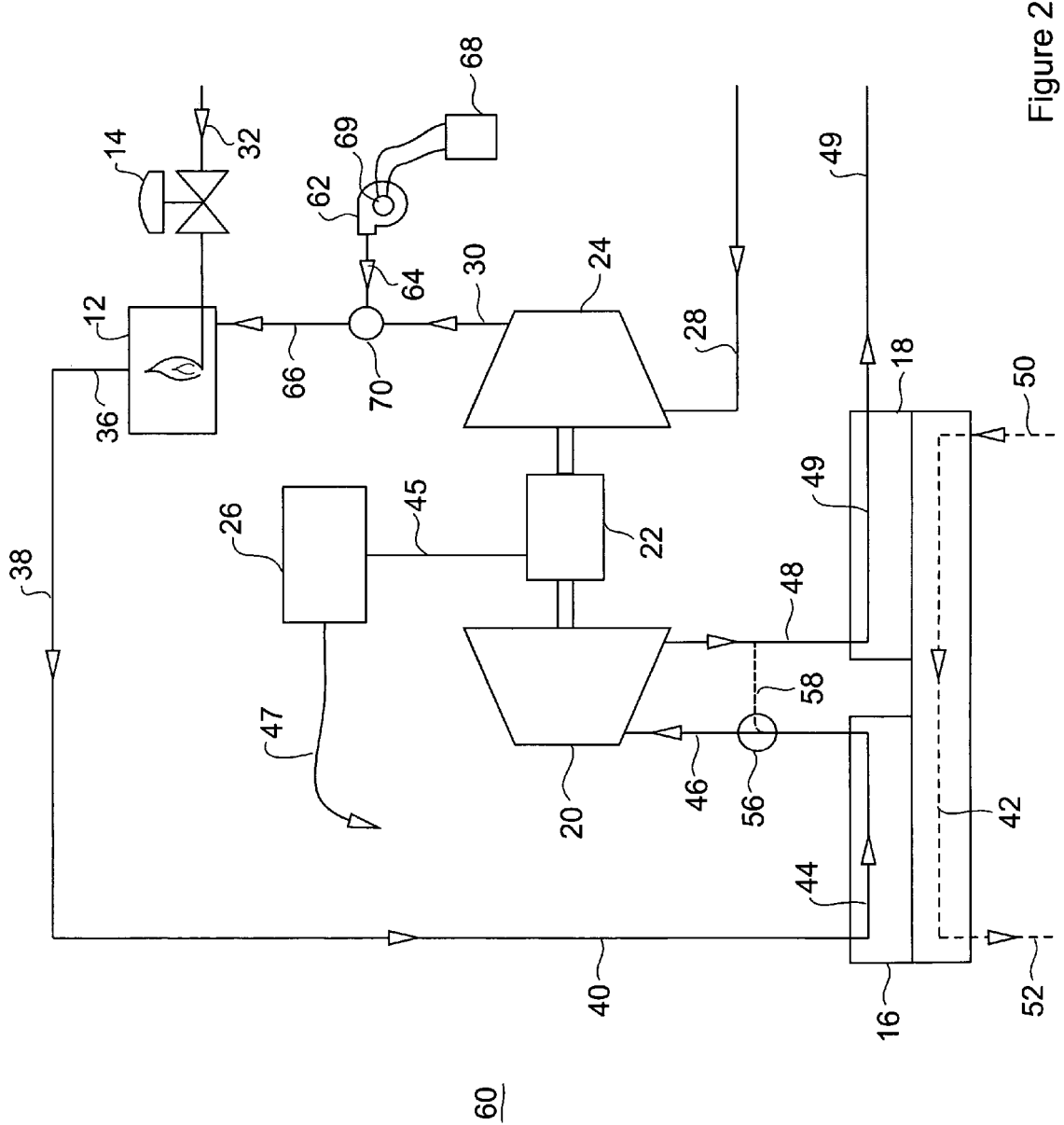
FIG. 2 is a schematic diagram of a second embodiment of a combined apparatus for heating fluid and generating electrical power, in accordance with the present invention.

Referring to FIG. 2, a combined apparatus 60 for heating a fluid and for producing electrical power is substantially the same as combined apparatus 10 described hereinabove, except that apparatus 60 further includes a starter blower 62 adapted to provide combustion air by forced draft to burner 12 when operation of apparatus 60 is initialized, as depicted by arrows 64, 66. In apparatus 60, generator 22 is not used as a starter motor. Therefore, there is no need for a power supply or starter motor to be associated with generator 22. Instead, a power supply, such as a battery 68, is provided to operate an electric motor 69, which is mechanically coupled to starter blower 62. Further, apparatus 60 includes a two-way valve 70, which is operable in a first position to allow blower 62 to provide combustion air to burner 12 and to circulate the products of combustion on system startup. The circulated products of combustion activate turbine 20, which in turn activates generator 22 and compressor 24. After compressor 24 has been activated, blower 62 is disengaged and valve 70 is moved to a second position to allow compressor 24 to provide combustion air to burner 12, as depicted by arrows 28, 30, 66, and to circulate the products of combustion through the system in the same manner as described hereinabove with reference to apparatus 10. One skilled in the art will recognize that apparatus 60 is similar to apparatus 10 described hereinabove in that both are "positive pressure" systems.

Figure 3:
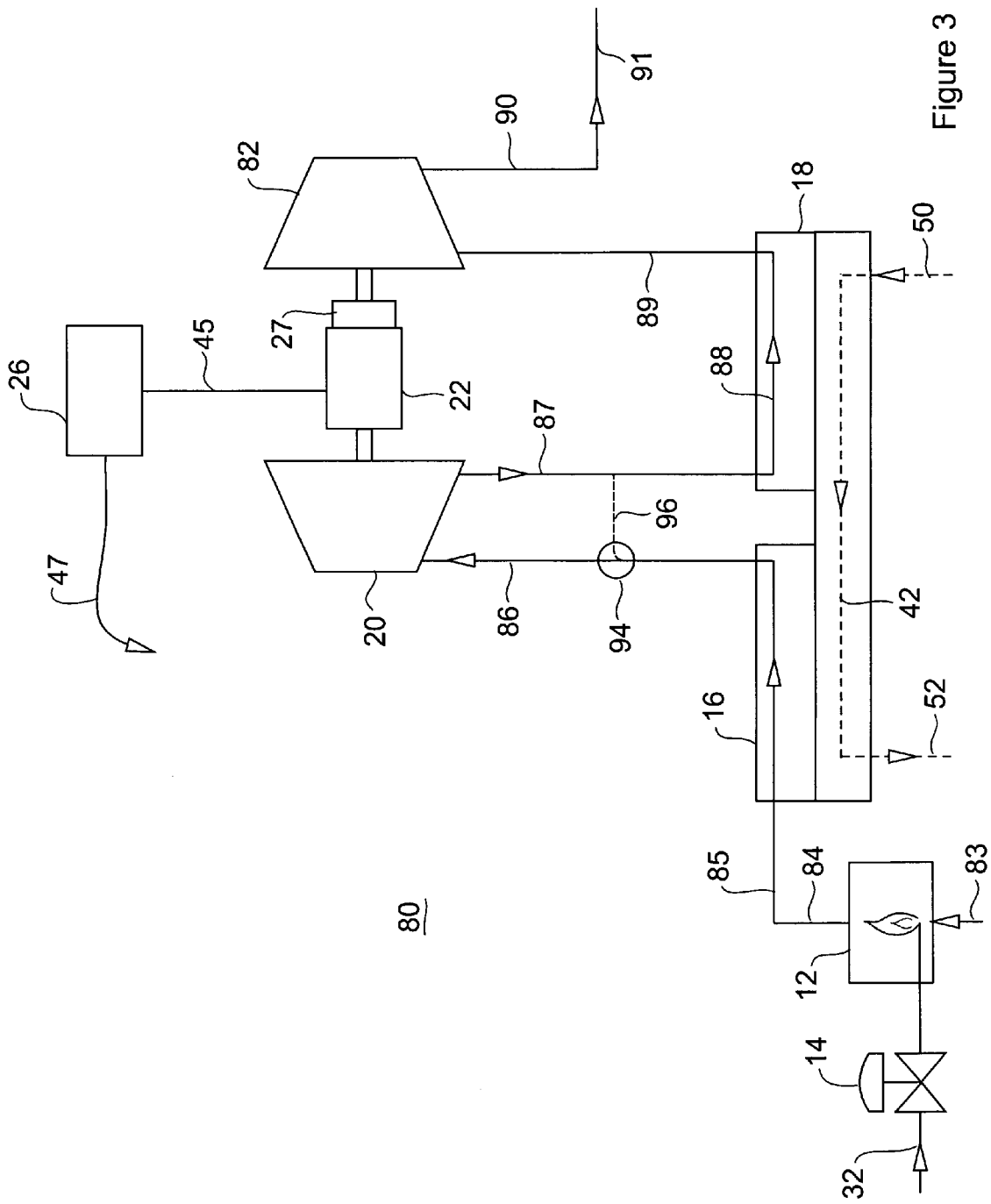
FIG. 3 is a schematic diagram of a third embodiment of a combined apparatus for heating fluid and generating electrical power, in accordance with the present invention.

Referring to FIG. 3, a combined apparatus 80 for heating a fluid and for producing electrical power is similar to combined apparatus 10 described hereinabove, except that apparatus 80 is a "negative pressure" system, wherein a compressor 82 is operable to draw combustion air into burner 12, as depicted by arrow 83, and to draw products of combustion first through heat exchanger 16, then through turbine 20 and then through heat exchanger 18 by induced draft, as depicted by arrows 84, 85, 86, 87, 88, 89, 90, 91, such that the system is under negative pressure with respect to atmospheric pressure. As in apparatus 10, the products of combustion enter turbine 20 after passing through heat exchanger 16 and before entering heat exchanger 18. Further, in apparatus 80 the products of combustion are drawn through compressor 82, as depicted by arrows 89, 90, after passing through heat exchanger 16, turbine 20 and heat exchanger 18, so that the products of combustion are relatively cool before entering compressor 82. The products of combustion are exhausted from compressor 82 through a flue or the like (not shown), as depicted by arrows 90, 91.

If it is desired to use apparatus 80 only as a heating apparatus and not to generate electrical power, a bypass valve 94 located between an outlet of heat exchanger 16 and an inlet of turbine 20 may be closed to inhibit products of combustion from entering turbine 20 and to cause the products of combustion to flow directly from heat exchanger 16 to heat exchanger 18, as depicted by arrows 96, 87.

Figure 4:
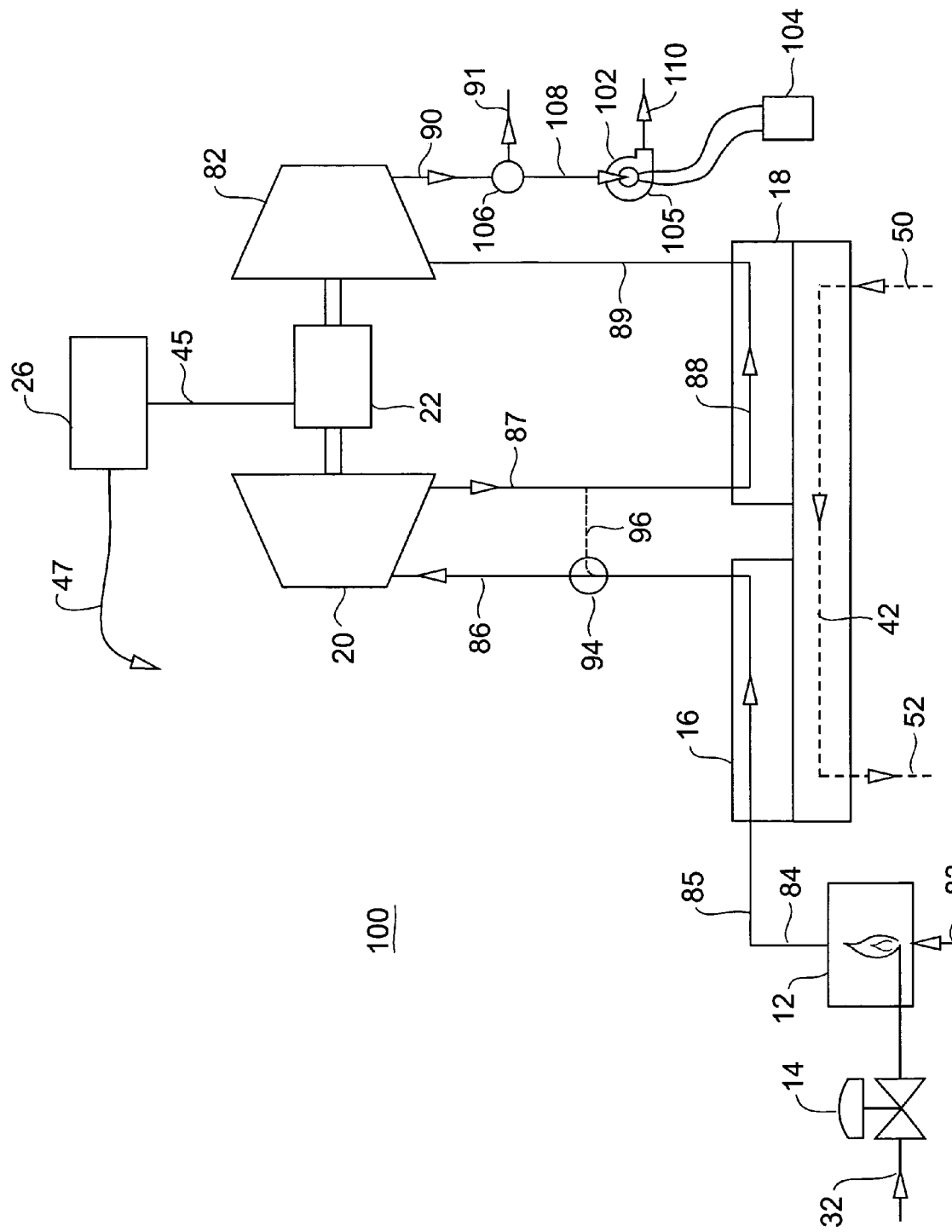
FIG. 4 is a schematic diagram of a fourth embodiment of a combined apparatus for heating fluid and generating electrical power, in accordance with the present invention.

Referring to FIG. 4, a combined apparatus 100 for heating a fluid and for producing electrical power is similar to combined apparatus 80 described hereinabove, except that apparatus 100 further includes a starter blower 102 adapted to provide combustion air by induced draft to burner 12 when operation of apparatus 100 is initialized, as depicted by arrow 83. Further, in apparatus 100, generator 22 is not used as a starter motor. Therefore, there is no need for a power supply or starter motor to be associated with generator 22. Instead, a power supply, such as a battery 104, is provided to operate an electric motor 105, which is mechanically coupled to starter blower 102.

Apparatus 100 further includes a two-way valve 106, which is operable in a first position to allow blower 102 to draw combustion air into burner 12, as depicted by arrow 83, and to draw the products of combustion through the system during startup. The products of combustion are exhausted by blower 102, as depicted by arrows 108, 110, through a flue or the like (not shown). The circulated products of combustion activate turbine 20, which in turn activates generator 22 and compressor 82. After compressor 82 has been activated, blower 102 is disengaged and valve 106 is moved to a second position to allow compressor 82 to provide combustion air to burner 12, as depicted by arrow 83, and to circulate the products of combustion through the system in the same manner as described hereinabove with reference to apparatus 80. One skilled in the art will recognize that apparatus 100 is similar to apparatus 80 described hereinabove in that both are "negative pressure" systems.

The best mode for carrying out the invention has now been described in detail. Since changes in and modifications to the above-described best mode may be made without departing from the nature, spirit and scope of the invention, the invention is not to be limited to the above-described best mode, but only by the appended claims and their equivalents.

The invention claimed is:

1. Combined apparatus for heating a fluid and for generating electrical power, said apparatus comprising:
    a heating device operable to burn a combustible fuel-air mixture to produce gaseous products of combustion;
    a heat exchanger adapted to receive the products of combustion and to transfer heat from the products of combustion to the fluid;
    a turbine in communication with said heat exchanger to receive the products of combustion after the products of combustion have passed through at least a portion of said heat exchanger, said turbine being operable by expansion of the products of combustion in said turbine; and
    an electrical generator co-operable with said turbine to produce electrical power.

2. Apparatus of claim 1 further including a compressor co-operable with said turbine and said generator to provide combustion air to said heating device.

3. Apparatus of claim 2 wherein said compressor is further operable to circulate the products of combustion through said heat exchanger and said turbine and to exhaust the products of combustion after the products of combustion have passed through said turbine and said heat exchanger.

4. Apparatus of claim 3 wherein said compressor is operable to provide combustion air to said heating device and to exhaust the products of combustion by induced draft, whereby the products of combustion are drawn through said compressor after the products of combustion have passed through said turbine and completely through said heat exchanger.

5. Apparatus of claim 1 wherein said heat exchanger has first and second portions, said first portion being located to receive the products of combustion before said second portion, said turbine being in fluid communication with said heat exchanger between an outlet of said first portion and an inlet of said second portion so that said turbine receives the products of combustion after the products of combustion have passed through said first portion and before the products of combustion enter said second portion.

6. Apparatus of claim 1 wherein said generator is further operable as a motor to initiate operation of said apparatus.

7. Apparatus of claim 6 further including an electrical power supply to provide electrical power to said generator when said generator is operable as a motor.

8. Apparatus of claim 1 further including an air mover to provide combustion air to said heating unit, whereby operation of said apparatus is initiated.

9. Apparatus of claim 8 further including a power supply to provide electrical power to said air mover.

10. Apparatus of claim 1 further including a bypass device selectively operable to inhibit the products of combustion from entering said turbine, thereby inhibiting generation of electrical power by said apparatus.

11. Apparatus of claim 1 further including an inverter adapted to convert the electrical power produced by said generator to an electrical output at a predetermined frequency.

12. Combined apparatus for heating a fluid and for generating electrical power, said apparatus comprising:
    a heating device operable to burn a combustible fuel-air mixture to produce gaseous products of combustion;
    a heat exchanger adapted to receive the products of combustion and to transfer heat from the products of combustion to the fluid;
    a turbine in communication with said heat exchanger to receive the products of combustion after the products of combustion have passed though at least a portion of the heat exchanger, said turbine being operable by the products of combustion in said turbine;
    an electrical generator co-operable with said turbine to produce electrical power; and
    a compressor co-operable with said turbine and said generator, said compressor being operable to provide combustion air to said heating device and to exhaust the products of combustion though said compressor after the products of combustion have passed completely though said heat exchanger.

13. Apparatus of claim 12
    wherein said heating device includes a burner for burning the combustible fuel-air mixture to produce the products of combustion, said heat exchanger being comprised of first and second sections, said first section being located proximate to said burner to receive the products of combustion before said second section, said apparatus including a diverting device to divert the products of combustion to the turbine after the products of combustion have passed through at least said first section.

14. Apparatus of claim 13 wherein said compressor is operable to draw the products of combustion through said compressor after the products of combustion have passed through said turbine and completely through said heat exchanger, whereby the products of combustion are exhausted from said apparatus.

15. Apparatus of claim 12
    wherein said heat exchanger is comprised of a primary heat exchanger and a secondary heat exchanger, said primary heat exchanger being located to receive the products of combustion before said secondary heat exchanger, said turbine being in communication with said heat exchanger between an outlet of said primary heat exchanger and an inlet of said secondary heat exchanger so that said turbine receives the products of combustion after the products of combustion have passed through said primary heat exchanger and before the products of combustion enter said secondary heat exchanger, said compressor being in communication with an outlet of said secondary heat exchanger so that the products of combustion are exhausted by said compressor after the products of combustion have passed through said turbine and through said primary and secondary heat exchangers.

16. Apparatus of claim 12 wherein said generator is further operable as a motor to initiate operation of said apparatus.

17. Apparatus of claim 16 further including a battery to provide electrical power to said generator when said generator is operable as a motor.

18. Apparatus of claim 12 further including a diverting device operable in a first mode to divert the products of combustion to said turbine after the products of combustion have passed through at least a portion of said heat exchanger to enable said power generating unit to produce electrical power, said diverting device being further operable in a second mode to inhibit the products of combustion from entering said turbine, thereby inhibiting said power generating unit from producing electrical power.

19. Apparatus of claim 12 further including an inverter adapted to convert the electrical power produced by said generator to an electrical output at a predetermined frequency.

20. Combined apparatus for heating a fluid and for generating electrical power, said apparatus comprising:
 a heating device operable to burn a combustible fuel-air mixture to produce gaseous products of combustion;
 a heat exchanger adapted to receive the products of combustion and to transfer heat from the products of combustion to the fluid;
 a turbine in communication with said heat exchanger to receive the products of combustion after the products of combustion have passed through at least a portion of the heat exchanger, said turbine being operable by the products of combustion in said turbine;
 an electrical generator co-operable with said turbine to produce electrical power;
 a compressor co-operable with said turbine and said generator, said compressor being operable to provide combustion air to said heating device and to exhaust the products of combustion through said compressor after the products of combustion have passed completely through said heat exchanger; and
 a diverting device operable in a first mode to divert the products of combustion to said turbine to enable said power generating unit to produce electrical power, said diverting device being further operable in a second mode to inhibit the products of combustion from entering said turbine, thereby inhibiting said power generating unit from producing electrical power.

21. A method for heating a fluid and for generating electrical power, said method comprising the steps of:
 burning a combustible fuel-air mixture to produce gaseous products of combustion;
 providing a heat exchanger and passing the products of combustion and the fluid through the heat exchanger so that heat is transferred from the products of combustion to the fluid;
 providing a turbine in communication with said heat exchanger and operating said turbine by directing a least some of the products of combustion to said turbine after said at least some of the products of combustion have passed through at least a portion of said heat exchanger; and
 providing an electrical generator co-operable with said turbine so that said generator is operated by operation of said turbine to produce electrical power.

22. The method of claim 21 further including the step of selectively preventing products of combustion from entering said turbine when it is desired not to operate said generator to produce electrical power.

* * * * *